No. 705,788. Patented July 29, 1902.
S. W. RAY.
ACETYLENE GAS GENERATOR.
(Application filed Oct. 2, 1901.)
(No Model.) 2 Sheets—Sheet 1.
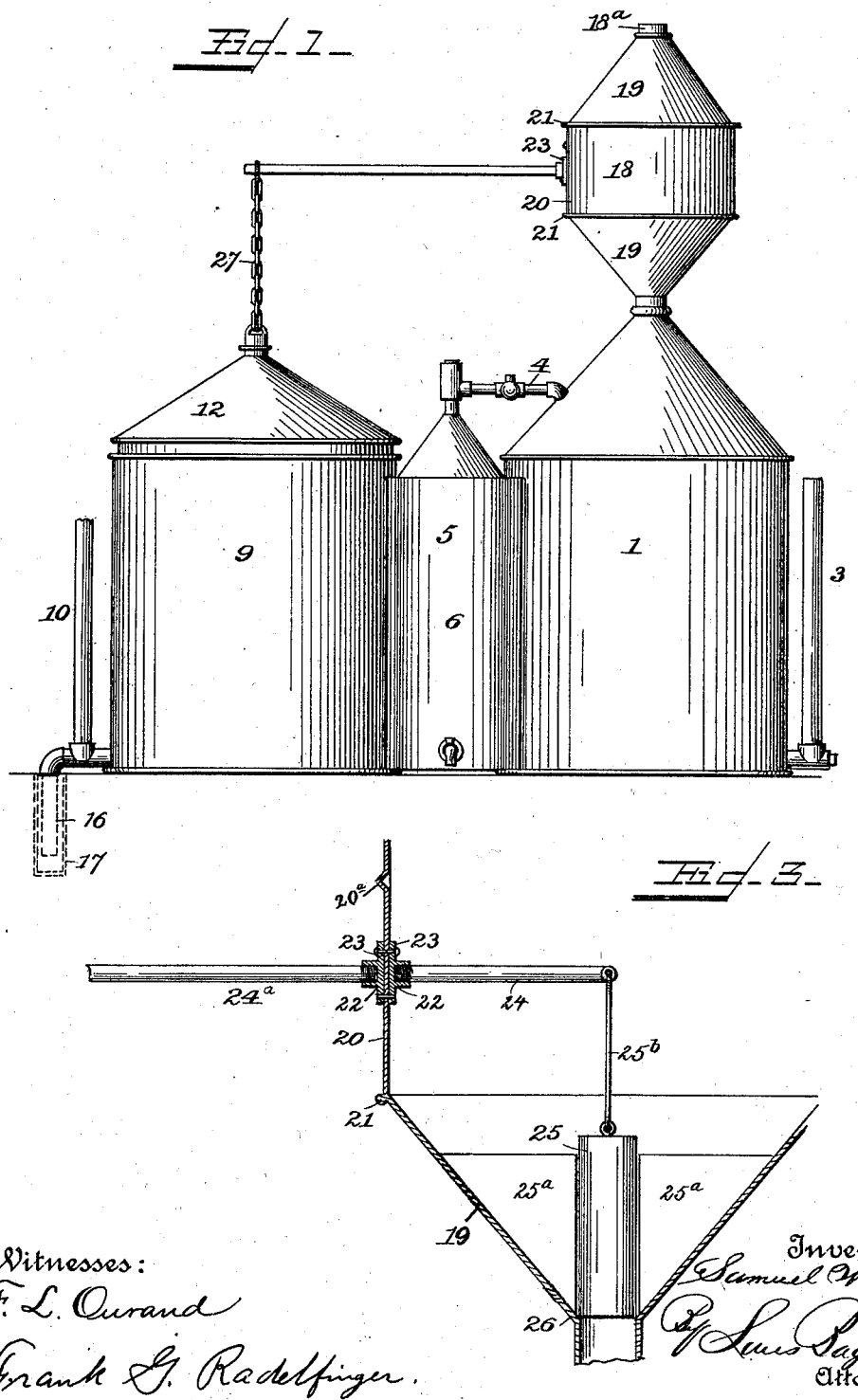
Witnesses:
F. L. Ourand
Frank G. Radelfinger.
Inventor:
Samuel W. Ray,
By Lewis Baggen & Co.
Attorneys.

No. 705,788. Patented July 29, 1902.
S. W. RAY.
ACETYLENE GAS GENERATOR.
(Application filed Oct. 2, 1901.)
(No Model.) 2 Sheets—Sheet 2.
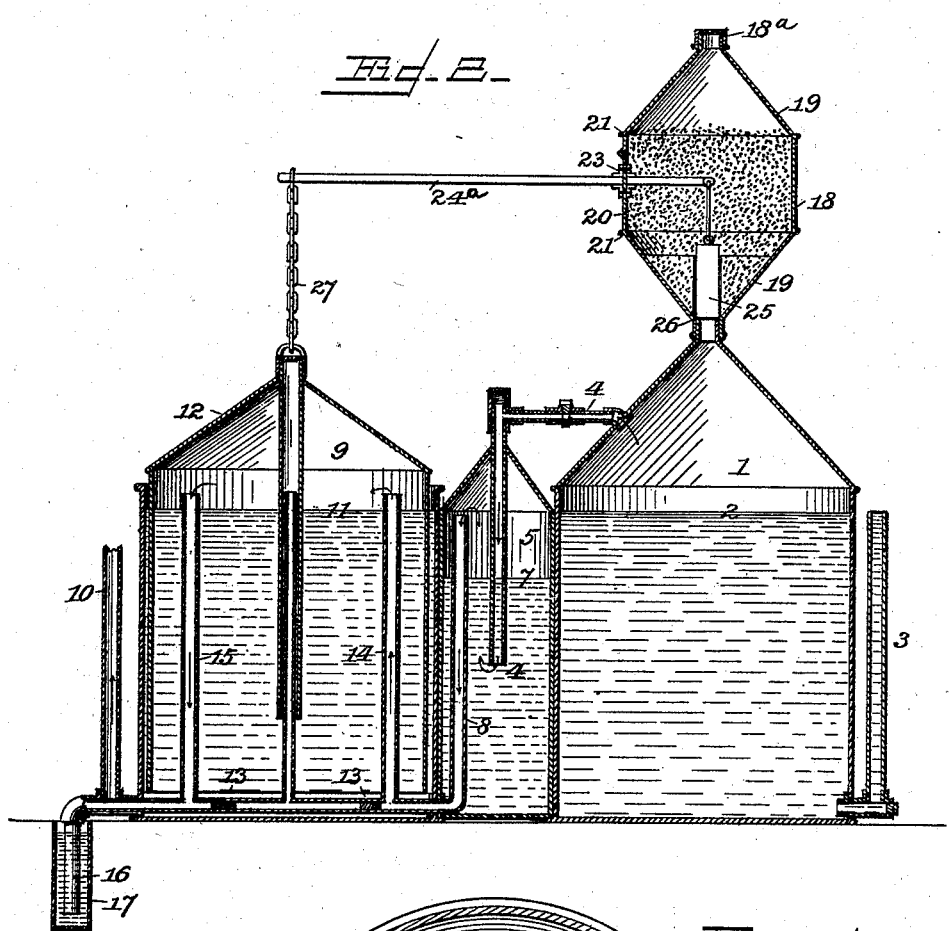
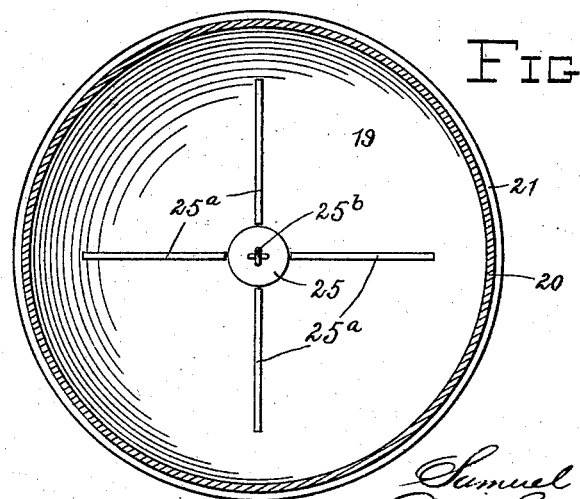
Witnesses:
F. L. Ourand
Frank G. Radelfinger.
Inventor:
Samuel W. Ray,
By Saur Dagger & Co,
Attorneys.

UNITED STATES PATENT OFFICE.

SAMUEL W. RAY, OF DALLAS, TEXAS, ASSIGNOR TO NEW PROCESS MANUFACTURING COMPANY, OF DALLAS, TEXAS.

ACETYLENE-GAS GENERATOR.

SPECIFICATION forming part of Letters Patent No. 705,788, dated July 29, 1902.

Application filed October 2, 1901. Serial No. 77,324. (No model.)

*To all whom it may concern:*

Be it known that I, SAMUEL W. RAY, a citizen of the United States, residing at Dallas, in the county of Dallas and State of Texas, have invented new and useful Improvements in Acetylene-Gas Generators, of which the following is a specification.

My invention relates to a carbid-feed for acetylene-gas generators; and the object of the same is to construct a device which will be operated by the fall of the gas-bell and a resilient diaphragm. This is accomplished by the simple and novel construction described in this specification and claimed, and illustrated in the accompanying drawings, forming a part thereof, in which—

Figure 1 is an elevation of my generator and gasometer. Fig. 2 is a vertical longitudinal section of the same. Fig. 3 is a detail of the carbid-receptacle. Fig. 4 is a detail horizontal section of the carbid-receptacle.

Like numerals of reference designate like parts in the different views of the drawings.

The numeral 1 designates the tank of my generator, which is normally filled with water up to the line 2. A stand-pipe 3, open at the top, is connected to the bottom of the generator 1 and is designed to serve as a water-gage and a safety-valve to relieve any excess of pressure caused by a stoppage in any of the pipes.

The generator 1 is connected at the top above water-line 2 to a pipe 4, which extends over and down into a purifier-tank 5, connected by a casing 6 to the generator and gasometer. The tank 5 is normally filled with water up to the line 7, and the open mouth of the pipe 4 is several inches below water-level. A pipe 8, having its open mouth above the water-line 7, passes down and out the side of the purifier 5 and into a gasometer-tank 9, through the gasometer, and connects with a gas-main 10. The tank 9 is filled with water up to the line 11, and a gas-bell 12 is mounted therein. Plugs 13 are placed in the pipe 8, and vertical inflow and outflow pipes 14 and 15, respectively, are joined to the pipe 8 on opposite sides of the plugs 13 and extend up into the gas-bell 12 to points above the water-line 11. A short vertical pipe 16 is connected to the outer end of the pipe 8 and is immersed in an open cup 17, filled with water. This latter arrangement forms a water seal and a safety-valve which prevents an excess of pressure.

To provide a supply of carbid, a receptacle 18 is mounted on the apex of the generator 1. The receptacle 18 comprises two conical portions 19, connected by a portion substantially cylindrical, but having a flat side 20. This flat side 20 faces the gasometer and consists of a vertical rectangular resilient metal diaphragm firmly secured at its edges 21. A V-shaped depression $20^a$, formed in the diaphragm, renders it more flexible and keeps it from buckling. This diaphragm 20 has centrally mounted thereon two couplings 22, secured by bolts 23 and located on opposite sides of the diaphragm. Screwed into the inner or outer couplings 22 are arms 24 $24^a$, respectively. The arms 24 $24^a$ form a lever, of which 24 is the short arm and $24^a$ the long arm. A valve 25, mounted in radially-extending guides $25^a$, is connected to the short arm 24 by a rigid link $25^b$ and is fitted in an aperture 26, which establishes communication between the receptacle 18 and the tank 1. The long arm of the lever $24^a$ is connected by a chain 27 to the top of the gas-bell. By this arrangement the valve 25 is operated positively in both directions. It is unseated by the descent of the gas-bell 12 and seated by the resilient action of the diaphragm 20 and the carbid fed into the generator as required.

In operation the tanks 1, 5, and 9 are filled with water up to the levels indicated and the carbid-receptacle 18 filled by way of the opening in the top closed by a screw-plug $18^a$. The carbid will trickle through alongside the valve 25 into the generator 1, and the generation of gas will start immediately. The gas will pass through the pipe 4 and be purified by the water in the tank 5 and then flow into the gasometer by way of the pipes 8 and 14. The inflow of gas will raise the bell 12 and permit the diaphragm 20 to seat the valve 25 and cut off the supply of carbid. By dropping or letting out links in the chain 27 the feed of the carbid can be regulated to a nicety. It should be noted that the component of force at right angles to the lever causes compound flexure in the diaphragm, which serves to return the lever to its normal position.

I do not wish to be limited as to details of construction, as these may be modified in many particulars without departing from the spirit of my invention.

Having described my invention, what I claim as new, and wish to secure by Letters Patent, is—

1. In an acetylene-gas generator, the combination with a generator-tank and a gasometer provided with a bell, of a carbid-receptacle mounted on said generator and communicating therewith, a diaphragm mounted in the side of said receptacle, inner and outer couplings secured to said diaphragm, a short arm secured to said inner coupling, a longer arm secured to said outer coupling, a valve mounted in said carbid-receptacle, and connected to said short arm, and means for connecting said long arm and said bell, said means being constructed to exert a component of force at right angles to said lever-arm thereby causing compound flexure in said diaphragm, substantially as described.

2. The combination with a generator of a carbid-receptacle connected to the top of said generator, a diaphragm mounted in the side of said receptacle, a lever connected to said diaphragm, a valve mounted in said receptacle and connected to said lever, and means operated by the gas-pressure for actuating said lever, said means being constructed to exert a component of force at right angles to the said diaphragm thereby causing compound flexure in said diaphragm, substantially as described.

3. The combination with a generator and a gasometer provided with a bell, of a carbid-receptacle connected to said generator, a diaphragm mounted in the side of said receptacle, a lever connected to said diaphragm, a valve mounted in said receptacle and connected to the short arm of said lever, and a flexible member connecting said lever and said gas-bell, said member being arranged to exert a component of force at right angles to said lever thereby causing compound flexure in said diaphragm substantially as described.

In testimony whereof I have hereunto set my hand in presence of two subscribing witnesses.

SAMUEL W. RAY.

Witnesses:
E. H. CONIBEAR,
C. D. TRINKLES.